United States Patent
Cometto et al.

(10) Patent No.: US 7,844,784 B2
(45) Date of Patent: Nov. 30, 2010

(54) LOCK MANAGER ROTATION IN A MULTIPROCESSOR STORAGE AREA NETWORK

(75) Inventors: Maurilio Cometto, Fremont, CA (US); Jeevan Kamisetty, San Jose, CA (US); Arindam Paul, Sunnyvale, CA (US); Varagur V. Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 508 days.

(21) Appl. No.: 11/605,614

(22) Filed: Nov. 27, 2006

(65) Prior Publication Data

US 2008/0126726 A1    May 29, 2008

(51) Int. Cl.
G06F 13/18    (2006.01)
(52) U.S. Cl. .................. 711/152; 711/150; 711/151
(58) Field of Classification Search .................. None
See application file for complete search history.

(56) References Cited

U.S. PATENT DOCUMENTS

| | | | |
|---|---|---|---|
| 5,701,495 A | | 12/1997 | Arndt et al. |
| 6,412,034 B1 * | | 6/2002 | Chan .................... 710/200 |
| 6,480,918 B1 * | | 11/2002 | McKenney et al. ......... 710/200 |
| 6,658,802 B2 | | 12/2003 | Ross et al. |
| 6,697,901 B1 * | | 2/2004 | Shun Chan .............. 710/200 |
| 6,816,891 B1 * | | 11/2004 | Vahalia et al. ............ 709/214 |
| 7,089,293 B2 | | 8/2006 | Grosner et al. |
| 7,197,588 B2 | | 3/2007 | Tsao et al. |
| 7,269,646 B2 | | 9/2007 | Yamamoto et al. |
| 2002/0157113 A1 | | 10/2002 | Allegrezza |
| 2004/0199512 A1 * | | 10/2004 | Cornwell et al. ............ 707/9 |
| 2006/0100993 A1 | | 5/2006 | Allen et al. |
| 2006/0149701 A1 * | | 7/2006 | Putzolu ................... 707/1 |
| 2006/0206901 A1 * | | 9/2006 | Chan ..................... 718/107 |

(Continued)

FOREIGN PATENT DOCUMENTS

WO    2008/067216    6/2008

(Continued)

OTHER PUBLICATIONS

Walder, "Storage Area Network Overview", downloaded Nov. 27, 2006, www.commsdesign.com/showarticle,9 pages.

(Continued)

*Primary Examiner*—Than Nguyen
(74) *Attorney, Agent, or Firm*—Weaver Austin Villeneuve & Sampson LLP

(57) ABSTRACT

In one embodiment, a solution is provided wherein a lock manager is kept moving among multiple cores or processors in a multi-core or multi-processor environment. By "hopping" the lock manager from processor to processor, a bottleneck at any of the processors is prevented. The frequency of movement may be based on, for example, a counter that counts the number of input/outputs handled by the lock manager and moves the lock manager to a different processor once a determined threshold is met. In another embodiment of the present invention, the frequency of the movement between processors may be based on a time that counts the amount of time the lock manager has been operating on the processor and moves the lock manager to a different processor once a predetermined time is reached.

32 Claims, 13 Drawing Sheets

U.S. PATENT DOCUMENTS

| | | |
|---|---|---|
| 2007/0204031 A1 | 8/2007 | Alstad et al. |
| 2008/0022280 A1 | 1/2008 | Cherkasova et al. |
| 2008/0126693 A1 | 5/2008 | Cometto et al. |
| 2008/0126726 A1 | 5/2008 | Cometto et al. |

FOREIGN PATENT DOCUMENTS

| | | |
|---|---|---|
| WO | 2008/067370 | 6/2008 |

OTHER PUBLICATIONS

PCT Search Report & Written Opinion mailed Aug. 21, 2008 for PCT Application No. PCT/US07/085750.

PCT Search Report & Written Opinion mailed Oct. 31, 2008 for PCT Application No. PCT/US07/085153.

US Office Action dated Apr. 23, 2008 for U.S. Appl. No. 11/605,843.

US Final Office Action dated Oct. 7, 2008 for U.S. Appl. No. 11/605,843.

US Office Action dated Mar. 18, 2009 for U.S. Appl. No. 11/605,843.

US Office Action dated Jul. 23, 2009 for U.S. Appl. No. 11/605,618.

US Office Action dated Mar. 8, 2010, from related U.S. Appl. No. 11/605,618.

US Final Office Action dated Dec. 11, 2009, from related U.S. Appl. No. 11/605,843.

US Office Action dated Apr. 2, 2010, from related U.S. Appl. No. 11/605,843.

* cited by examiner

LOCK MANAGER ROTATION IN A MULTIPROCESSOR STORAGE AREA NETWORK

BACKGROUND

1. Technical Field

The present disclosure relates to storage area networks.

2. Description of the Related Art

Storage Area Networks (SANs) are computer systems in which large mass storage devices such as Redundant Array of Independent Disks (RAID) devices are connected to a central processor or processors via high-speed network technology (as opposed to, for example, via a system bus). SANs are increasingly used to store vast amounts of information and their usage has grown exponentially with the rise of the Internet.

There are two general ways to implement SANs: centralized and decentralized. A centralized SAN ties multiple hosts into a single storage system with large amounts of cache and redundant power supplies. FIG. 1 illustrates a typical centralized SAN. Initiators, also known as hosts 100, 102, 104 communicate with a large mass storage device 106.

A decentralized SAN, on the other hand, connects multiple mass storage devices with a centralized controller, such as a switch, that coordinates storage between the hosts and the multiple mass storage devices. FIG. 2 illustrates a typical distributed SAN. Here, initiators 200, 202, 204 communicate with a virtual SAN comprised of a number of large mass storage devices 206, 208, 210 via a switch 212.

There are a number of various applications that can be utilized within a SAN, for example, volume management applications, data replication applications, data migration applications, and data protection applications, among many others. These applications are operated at either the host side or the storage side.

FIG. 3 illustrates the operation of an IO command in a typical SAN. The command 300 is sent from initiator 302 to storage 304. In this example, the command may be a read request. As such, storage 304 then sends back data items 306, 308, 310 to initiator 302. Once all the data has been sent, storage 304 sends back a response message 312.

Applications operated on the host side are able to shield the physical details of the operations from the storage side. Similarly, applications operated on the storage side are able to shield the physical details of the operations from the host side. However, in either implementation, users are often beholden to a single vendor. For example, should a user wish to implement a host-side application, any host utilizing the application must be from the vendor who distributed the host-side application. Likewise, should a user wish to implement a storage-side application, any storage utilizing the application must be from the vendor who distributed the storage-side application.

DESCRIPTION OF EXAMPLE EMBODIMENTS

Overview

A solution is provided wherein a lock manager is kept moving among multiple cores or processors in a multi-core or multi-processor environment. By "hopping" the lock manager from processor to processor, a bottleneck at any of the processors is prevented. The frequency of movement may be based on, for example, a counter that counts the number of input/outputs handled by the lock manager and moves the lock manager to a different processor once a determined threshold is met. In another embodiment of the present invention, the frequency of the movement between processors may be based on a time that counts the amount of time the lock manager has been operating on the processor and moves the lock manager to a different processor once a predetermined time is reached.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

A solution is provided wherein SAN applications are moved to the switch in a distributed SAN environment. This allows the applications to operate efficiently and effectively without regard for the particular vendors of the hosts and storages. It also provides a single point of management.

The input and output from and to hosts and storages in a SAN are known collectively as the SAN's exchange, or flow. The exchange is typically measured in Input/Outputs (IOs). Traditionally, each input or output was sent by a host and terminated at a storage, or vice-versa. This is because the application that would be transmitting or interpreting the IO was located at either a host or a storage. Since the present invention describes moving the application to the switch, in an embodiment of the present invention IOs may be terminated at the switch (or some other located in between the host and the storage). It should be noted that the term "storage" as used throughout this document shall refer to either a single storage device or a group of storage devices.

Figure 1:
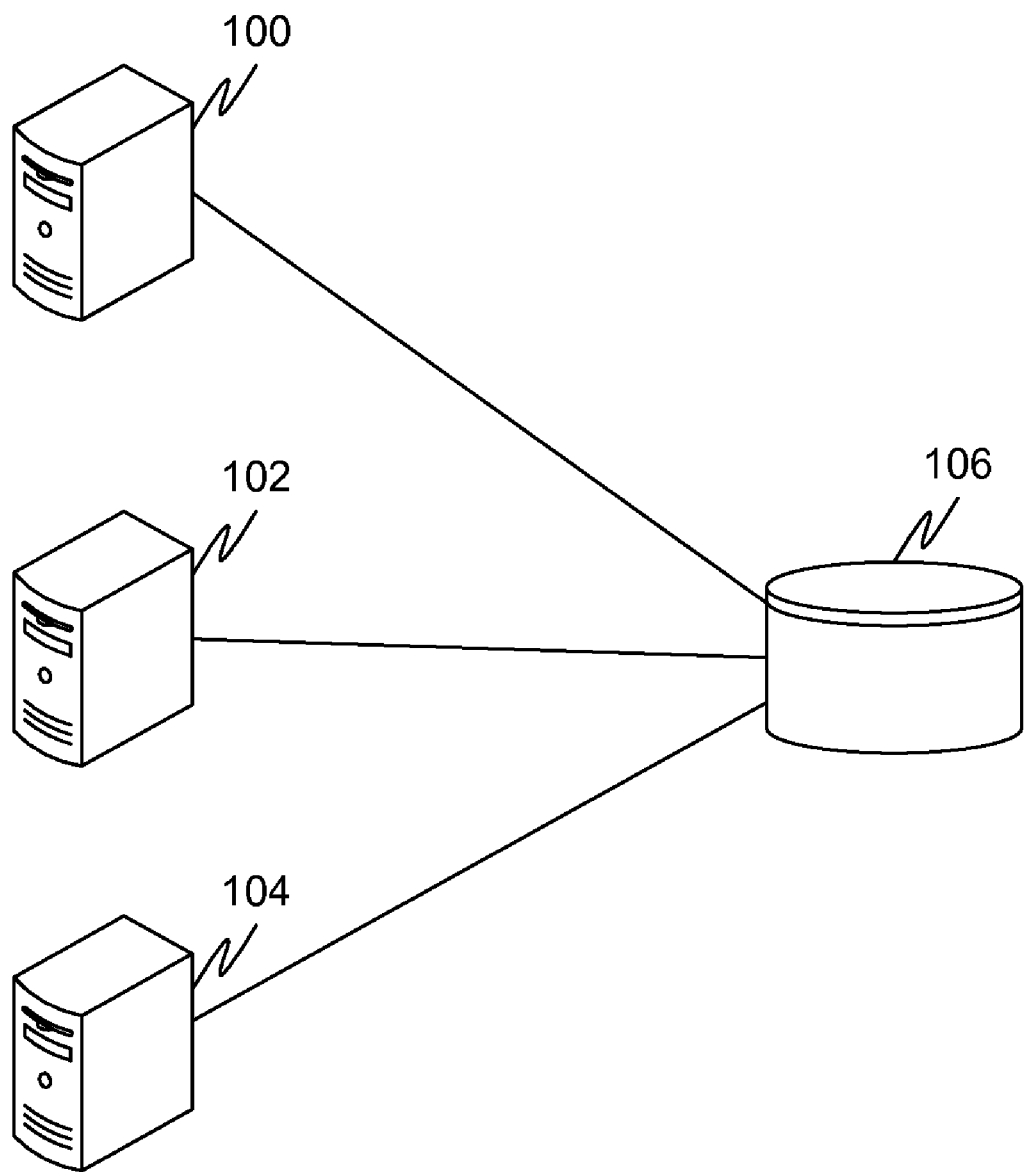
FIG. 1 illustrates a typical centralized SAN.
Figure 2:
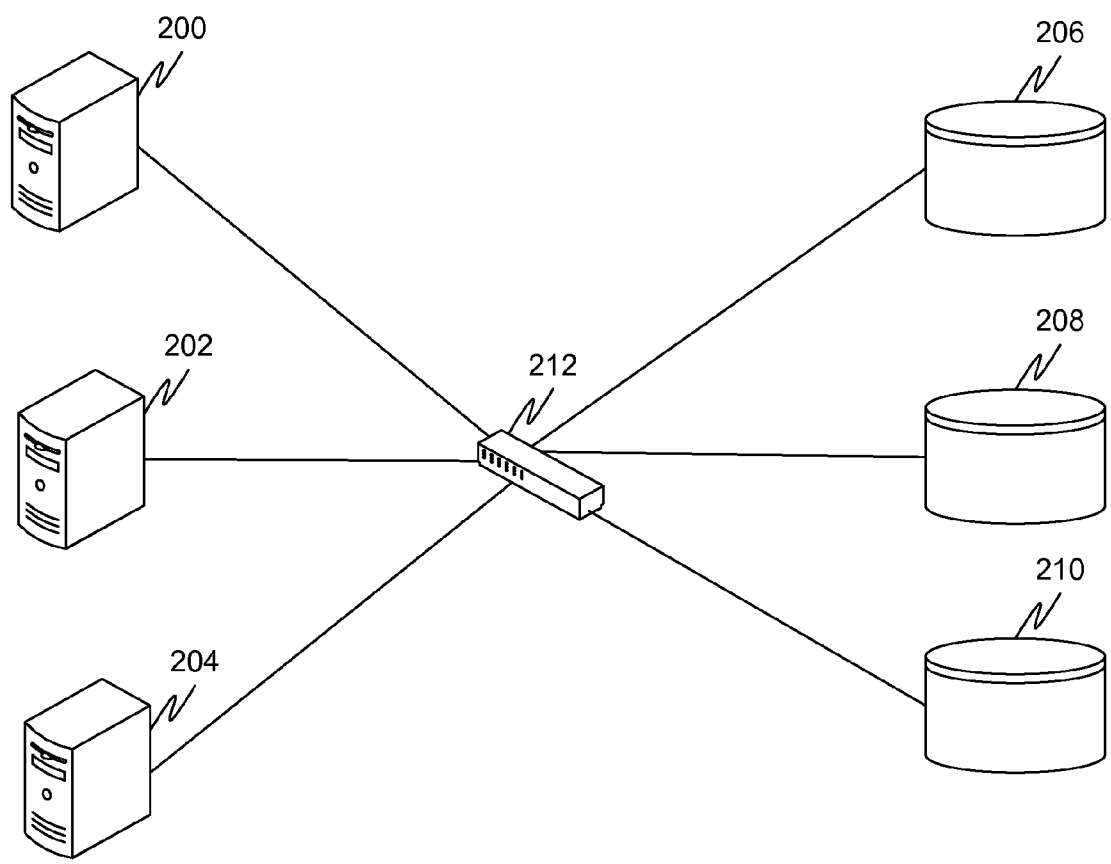
FIG. 2 illustrates a typical distributed SAN.
Figure 3:
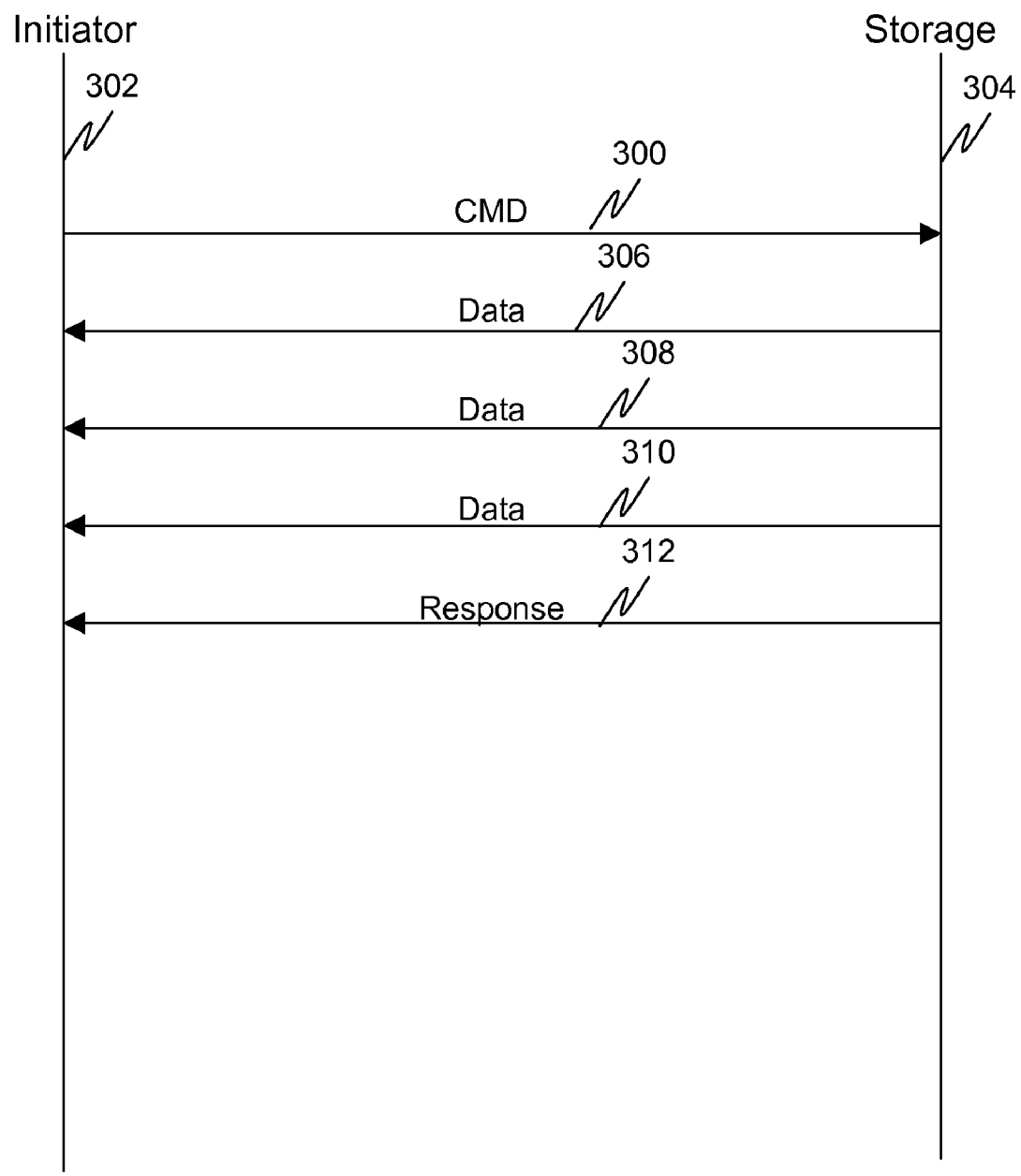
FIG. 3 illustrates the operation of an IO command in a typical SAN.
Figure 4:
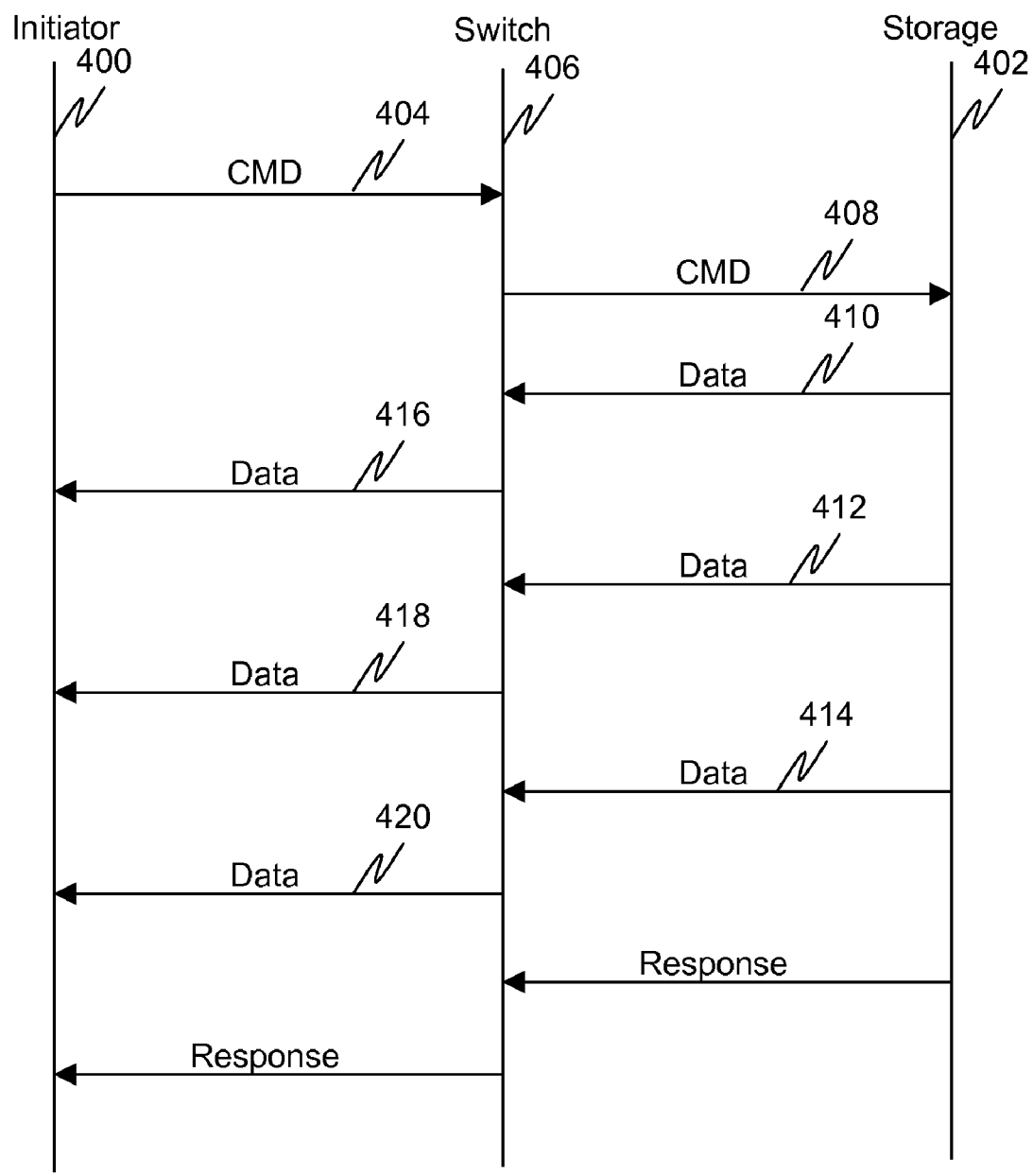
FIG. 4 illustrates an example of a command executed in a SAN.

FIG. 4 illustrates an example of a command executed in a SAN. Similar to FIG. 3, the command in this figure is a read request. However, rather than communications occurring directly between initiator 400 and storage 402, the command 404 must first be terminated at the switch 406. The switch 406 then performs one or more processes on the commands, and then generates a resulting command 408 for communication to the storage 404. The same is true of data messages 410, 412, 414, which are terminated at the switch 406, where processes may be performed upon them prior to the data 416, 418, 420 being replayed to the initiator 400.

In one embodiment of the present invention, customized hardware may be utilized that is compatible with a standard switch. Such an embodiment avoids the necessity of modifying the switch itself. This hardware may be known as a storage services module (SSM), which may be a blade that plugs into the switch and comprises hardware and software. Alternative embodiments are possible where the switch itself is utilized, or where alternative hardware and/or software is utilized.

Figure 4A:
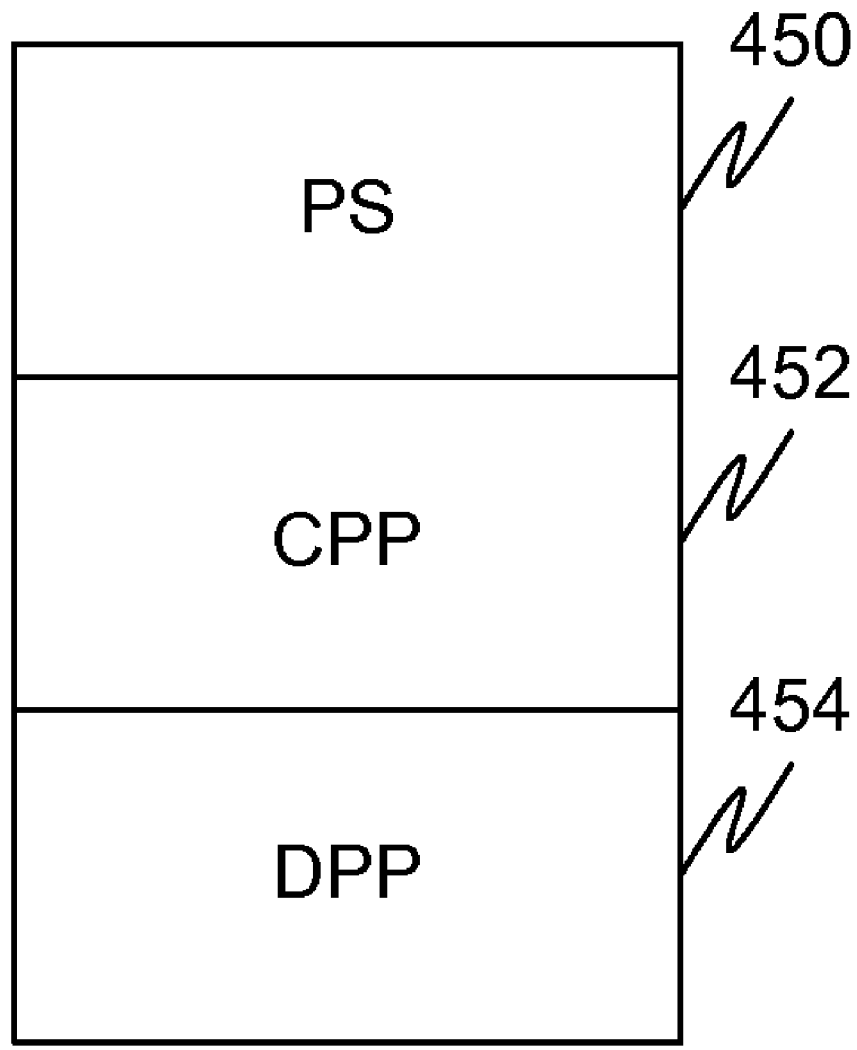
FIG. 4A illustrates an example software stack.

In an embodiment of the present invention, the software utilized may be split into three separate parts. FIG. 4A illustrates an example software stack. Partner Software (PS) layer 450 may include the underlying application to be run. A Control Path Processor (CPP) layer 452 may control the software and hardware. A Data Path Processor (DPP) layer 454 may be where the application processes themselves may be executed. Each DPP essentially represents a single processor or core in a multi-processor or multi-core environment.

One common protocol used to communicate within a SAN is the Small Computing System Interface (SCSI). Hosts can communicate at high speed via the SCSI protocol by utilizing Fibre Channel (FC) switching technology. Recent advancements have allowed such communications to occur at up to 10 Gb/s using 10 Gb/s FC or the 10 Gig Ethernet standards. It would be advantageous, therefore, for the complex virtualization functions performed by SAN switches to also be performed at 10 Gb/s, lest a bottleneck be created. Unfortunately, the single processor architecture that is common in most switches is not a viable solution for these levels of line speeds. Any solution requires the use of multi-processor or multi-core processor technology.

Such high performance, however, requires complex software. There are a number of various technical issues that arise when attempting to control a virtual SAN using multi-core processors.

One common concern in all storage devices pertains to data integrity. Specifically, it is often necessary to lock particular portions of storage volumes when multiple hosts are accessing the same storage volume to ensure that only one host may modify the underlying data at a time. Data corruption and possible system failure could occur if no locks were in place and two hosts issued contradictory write commands. Prior to accessing a volume, initiators issue an interlock request, which requests that the volume be locked. In a typical single-core or single-processor environment, a centralized lock manager for each storage volume receives the interlock requests and controls the locking of the corresponding storage volume to ensure data integrity. Such a centralized lock manager, however, is not possible in a multi-core or multi-processor environment if one desires the high line speeds previous discussed. This is because a single lock manager would represent a potential point of bottleneck at the switch.

In order to solve this problem, an embodiment of the present invention is provided in which the lock manager for each volume is kept moving among the multiple cores or processors. By "hopping" the lock manager from processor to processor, a bottleneck at any of the processors is prevented. It is desirable to move the lock manager from processor to processor often to prevent such a bottleneck, but not so often that it becomes inefficient. In an embodiment of the present invention, the frequency of the movement between processors may be based on a counter that counts the number of IOs handled by the lock manager and moves the lock manager to a different processor once a predetermined threshold is met. In another embodiment of the present invention, the frequency of the movement between processors may be based on a time that counts the amount of time the lock manager has been operating on the processor and moves the lock manager to a different processor once a predetermined time is reached. It should be noted, that when the predetermined threshold or timer is reached, it is possible that the currently selected processor may still be the least loaded processor. In such a case, embodiments are possible that either change processors anyway, or where the least loaded processor is always selected, even if it is the same processor as the currently selected processor.

In an embodiment of the present invention, when the lock manager is moved to a different processor, the processor chosen is the one that is least loaded (i.e., is processing the least amount of IOs at the moment). Other embodiments are possible where other criteria are utilized either in conjunction with or instead of the load level of the processors, such as a random selection routine, round robin scheme, or user selections.

Figure 5:
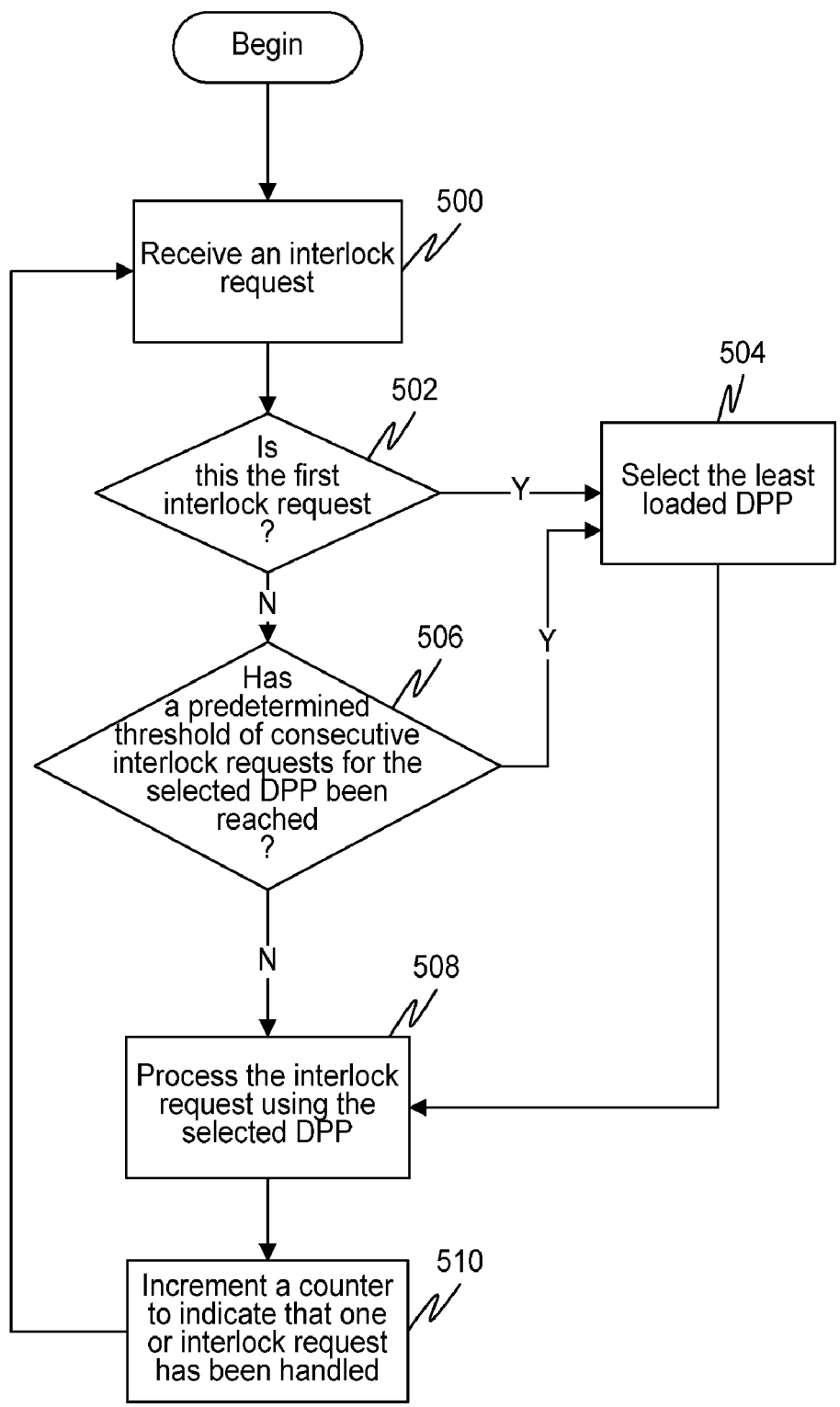
FIG. 5 illustrates an example method for handling an interlock request.

In an embodiment of the present invention, mutual access to the same Virtual Logic Unit Number (VLUN) is provided using the lock manager described above. FIG. 5 illustrates an example method for handling an interlock request. This process may be performed at an intermediary between the host and the storage sides of the SAN, such as in a switch. However, embodiments are possible wherein the process is performed physically at the host and storage sides but the software acts as an intermediary. At 500, an interlock request is received. At 502, it is determined if this is the first interlock request. If so, then at 504, the least loaded DPP may be selected. If not, then a DPP would have been previously selected. As such, at 506, it may be determined if a predetermined threshold of consecutive interlock requests for the selected DPP has been reached. This may be accomplished by comparing counter of interlock requests to a predetermined number. A timer may be used and the timer may be compared against a predetermined time. If the predetermined threshold has been reached, then the process proceeds to 504, where the least loaded DPP is selected. At 508, the interlock request is processed by the selected DPP. At 510, a counter may be incremented (or decremented, based on the embodiment utilized) to indicate that one more interlock request has been handled. The process then loops to 500 for each interlock request received.

In another embodiment, a processor such as the multi-core Octeon processor may be utilized. In this embodiment, interlock requests are embodied in data structures known as work queue entries (WQEs), which may be tagged with a tag to indicate that the WQE is an interlock request. A core picks up the WQE and processes it. After processing a certain number of WQEs (or based on time), the core changes a core-group to core-mapping so that subsequent WQEs that are queued get dispatched to the new core(s) and processed there. The new core may be the least busy of the core-group. By doing so, the load balancing is accomplished transparently.

Figure 6:
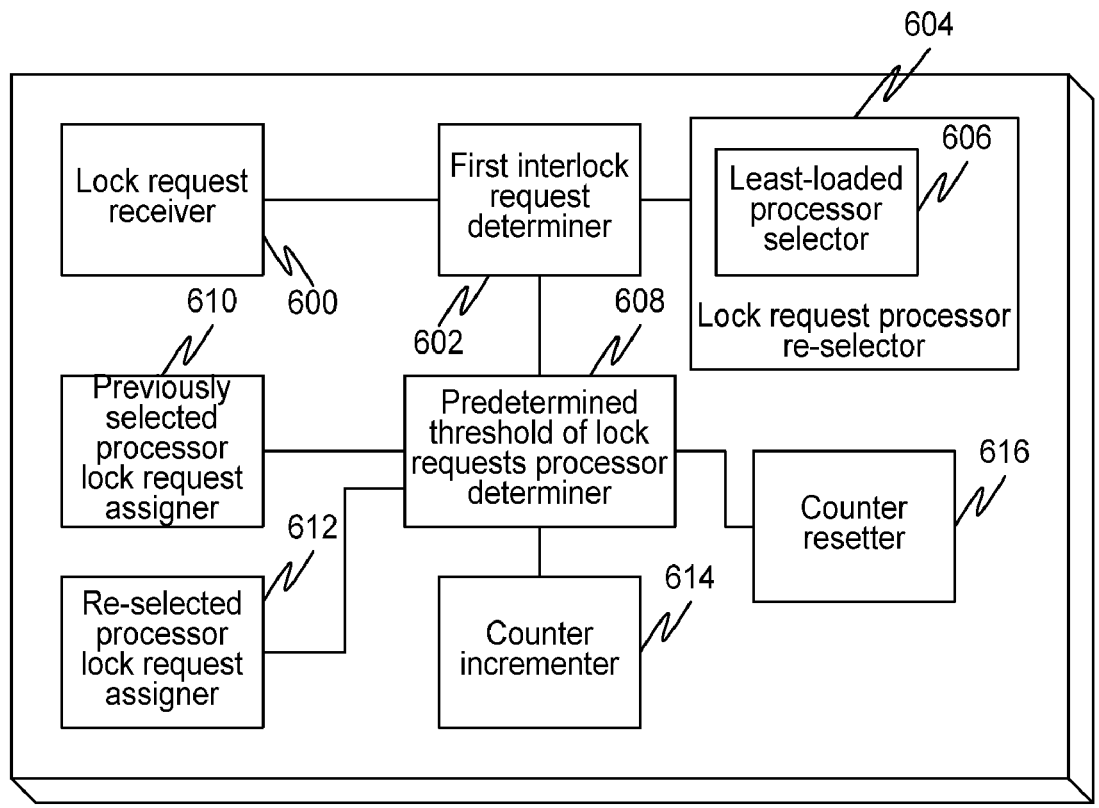
FIG. 6 illustrates an example apparatus for handling an interlock request.

FIG. 6 illustrates an example apparatus for handling an interlock request. A lock request receiver 600 may receive an interlock request. A first interlock request determiner 602 coupled to the lock request receiver 600 may determine if this is the first interlock request. If so, then a lock request processor re-selector 604 coupled to the lock request receiver 600 may select a processor to handle the lock request. This may include a least-loaded processor selector 606 which may select the least loaded processor. If this is not the first interlock request, then a DPP would have been previously selected. As such, a predetermined threshold of lock requests processor determiner 608 coupled to the first interlock request determiner 602 and to the lock request processor re-selector 604 may determine if a predetermined threshold of consecutive interlock requests for the selected DPP has been reached. In an alternative embodiment, this component may be replaced with a predetermined time processor determiner, which may determine if a timer for the selected processor has reached a predetermined time. If the predetermined threshold or time has been reached, then the lock request processor reselector 604 may select a processor to handle the lock request. The interlock request may then be processed by the selected DPP. If the predetermined threshold or time has not been reached, this may include assigning the lock request to the previously selected processor using a previously selected processor lock request assigner 610 coupled to the predetermined threshold of lock requests processor determiner 608. If the predetermined threshold or time has not been reached, this may include assigning the lock request to the newly selected processor using a re-selected processor lock request assigner 612 coupled to the predetermined threshold of lock requests processor determiner 608. A counter incrementer 614 coupled to the predetermined threshold of lock requests processor determiner 608 may increment a counter if the predetermined threshold or time has not been reached, while a counter resetter 616 coupled to the predetermined threshold of lock requests processor determiner 608 may reset the counter if the predetermined threshold or time has been reached. Note that the individual elements described above, as well as elements in other diagrams throughout this document, do not need to be distinct devices or components. One of ordinary skill in he art will recognize that the operations of any two or more of the elements may be combined into a single component.

Another issue that arises in multi-core or multi-processor SAN environments relates to the management of state information. Hosts and storages maintain state information in data structures known as contexts. This is typically known as the host-context on the host-side, and the disk-context on the storage side. Both host-contexts and disk-contexts, however, require mutually exclusive access because they contain state variables. In an embodiment of the present invention, this may be accomplished via separate entries, such as Ternary Content Addressable Memory (TCAM) entries, for each of the contexts. Each host IO may be assigned a host-context. Each IO to the storage side performed by the virtualization function may be assigned a disk context. This context may be useful in keeping track of, for example, how much processing of the IO has been performed at any given instant. Whenever a new event occurs in the IS, such as a response message, this context may be retrieved.

In an embodiment of the present invention, the processing required to service a particular IO to completion is kept within a single DPP as much as possible. This minimizes expensive lookups. It also takes advantage of hot data in the local cache. Since only one DPP is processing an exchange, it need not be flushed back to memory and reread by another DPP. In another embodiment, new IOs may be redirected to the least loaded DPP, thereby improving latency. Additionally, interactions between software on the DPP and ASIC hardware may be minimized.

In this embodiment of the present invention, both tag and soft switching as well as an explicit locking model may be utilized to perform exchange level load balancing. This allows an exchange to be completely handled at one core, thus leveraging the core resident data cache more effectively and not polluting data caches of other cores with the same data copies. In addition to the queues provided by the hardware (typically one queue per core group), each core may additionally have a soft queue, which is managed by software on the particular core. This allows direct accessing of the particular core, as opposed to the hardware work queue, which covers multiple cores and does not permit the specification of a particular core to which to assign a particular frame or event. These soft queues may reside in shared memory so that any core can enqueue a frame/event when it wishes to dispatch the frame/event to a particular core. In one embodiment of the present invention, only the owner (core) of the queue will dequeue and process the frames/events. In this embodiment the hardware plays no role in managing these queues. A scheduler may poll events from the hardware work queue provided by the cores and the software work queue. This scheduler may poll events from the hardware work queue only after making sure the software work queue is empty for that core. This ensures proper load balancing across cores and gives proper authority to software events. The explicit locking model is accomplished by having all data structures that will be shared across cores be explicitly locked. The frames may be processed in two stages.

The first stage may begin by performing frame level error checks. This may include such checks as a cyclic redundancy check. Then the stage may proceed to determining the type of the frame. A lookup may be performed to determine if the frame is, for example, a command frame, a data frame, a transfer frame, or a response frame. For command frames, tag switching may be performed using the hardware work queues using a queue pointer (such as an Initiator Target LUN. For data, transfer, or response frames, an exchange table lookup may be performed for the pointer to obtain the core identification of the core that is processing the exchange. The tag may then be switched using the pointer as the new tag for the frame. This assigns the frame to a particular core group, but not a particular core. The frame may then be dispatched to the particular core using the corresponding software work queue. The exchange table entries for the host/disk exchanges may have been programmed during a previous operation of the second stage, during host command processing. Alternatively, the table may have been created at some other time.

The second stage may involve the complete frame processing. For a command frame, an exchange table entry may be created for the host exchange and its core identification may be assigned as the core that's processing the command. Then command level processing such as an Extent Map (XMAP) or Virtual-to-Physical (V2P) lookup, sending commands to the target, etc. may be performed. For data, transfer, or response frames, the contexts will most likely be in the data cache, thus the hot cache may be utilized without the need to make frequent flushes or searches for data.

Thus, when a command frame is received, the hardware may choose the least loaded processor to process the command frame. Once the hardware dispatches the command frame to a particular core, this command is immediately assigned to the core in the exchange table. From that point onwards, all events relevant to the command frame are handled by that core. This happens through a combination of software work queues, serializing on data structure accesses as and when needed through tag switching, and logically dividing the entire virtualization tasks into two stages. Thus, by restricting the exchange to a particular core, the following benefits may be obtained:

Expensive lookups are minimized—since the core identification is stored in the exchange itself, the various events for an exchange can be deterministically assigned to a particular core responsible for that exchange in first order time.

Hot data in a local cache may be utilized—since only one core handles an exchange, the probability of the various objects related to that exchange residing in the data cache of a particular core is significantly higher.

New input/outputs may be redirected to the least loaded core by leveraging the hardware functionality. This hardware may choose the least loaded core each time a new command frame is received.

Resources in the exchange may be managed more efficiently—since the exchange is restricted to one particular core, the various objects needed to complete an exchange may be allocated from its pool and subsequently freed into the same pool.

Reduced contention for locks—since a particular context is "owned" by a single core, the number of times a context has to be locked for exclusive access is greatly reduced.

In another embodiment of the present invention, the granularity of the frame types may be set to an extremely fine level. This allows, for example, different stages of processing of an exchange to be handled by different cores, going to the least loaded processor each time. This is due to the fact that there are certain types of frames that do not really need to share the same cache as previous frames in the exchange, and thus it would be more efficient to forward these frames to the least loaded processor in real time as opposed to possibly sending it to an overloaded processor unnecessarily. Pursuing this strategy also eliminated the need for a centralized lock measure or other preemptive measures to get exclusive access to the various context states necessary to completely process a frame.

Another issue, which becomes more prevalent as the granularity of the frame types is set to finer and finer levels, is the need to "chase" the exchange. Namely, it is possible that a particular frame may be assigned to a software work queue for a particular core, but by the time the frame is ready to be processed (e.g., it is at the head of the line), the core that owns the exchange may have changed. In order to handle such instances, in an embodiment of the present invention the processor, prior to actually processing the frame, will double check to make sure that it is still the owner, and if not, the frame will be placed in the software work queue corresponding to the new owner of the exchange.

Figure 7:
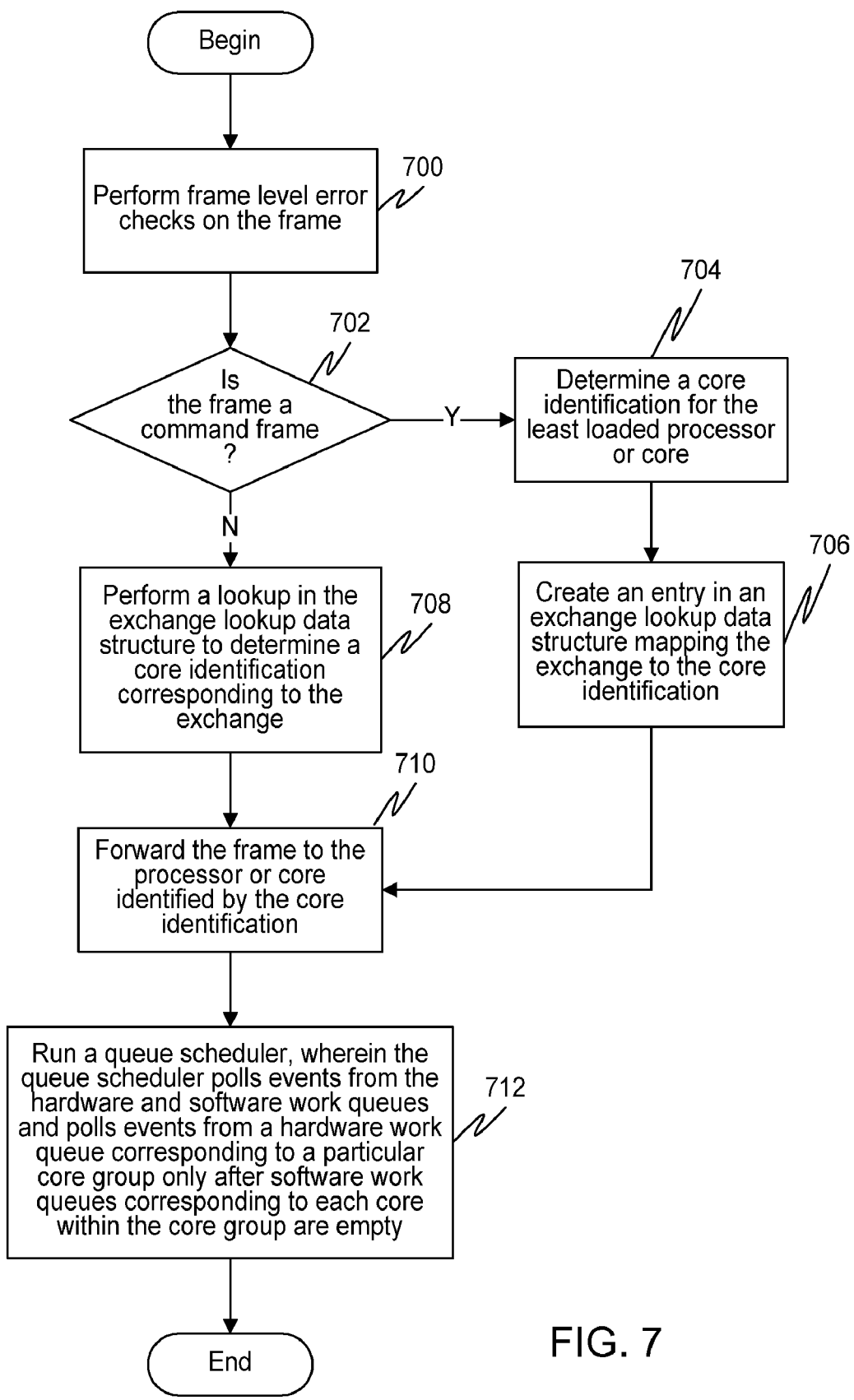
FIG. 7 illustrates an example method for handling a frame at a device having multiple processors or cores in a storage area network.

FIG. 7 illustrates an example method for handling a frame at a device having multiple processors or cores in a storage area network. The frame may correspond to a particular exchange. This may be indicated by, for example, an exchange identification in the frame, although one of ordinary skill in the art will recognize that there may be other ways to track which exchange corresponds to a frame. At 700, frame level error checks may be performed on the frame. At 702, it may be determined if the frame is a command frame. If the frame is a command frame, then at 704, a core identification for the least loaded processor or core may be determined. This may be accomplished by placing the frame in a hardware work queue corresponding to a core group. The hardware work queue may utilize an Initiator Target Logic Unit Number (ITL) pointer as a tag to perform tag switching. Then at 706, an entry may be created in an exchange lookup data structure mapping the exchange to the core identification. If the frame is not a command frame, then at 708, a lookup may be performed in the exchange lookup data structure to determine a core identification corresponding to the exchange. Then, at 710, the frame may be forwarded to the processor or core identified by the core identification. This may be accomplished by placing the frame in a software work queue corresponding to the processor or core identified by the core identification. At 712, a queue scheduler may be run, wherein the queue scheduler polls events from a hardware work queue corresponding to a particular core group and software work queues corresponding to each core within the core group, and wherein said queue scheduler polls events from said hardware work queue only after said software work queues are empty.

Figure 8:
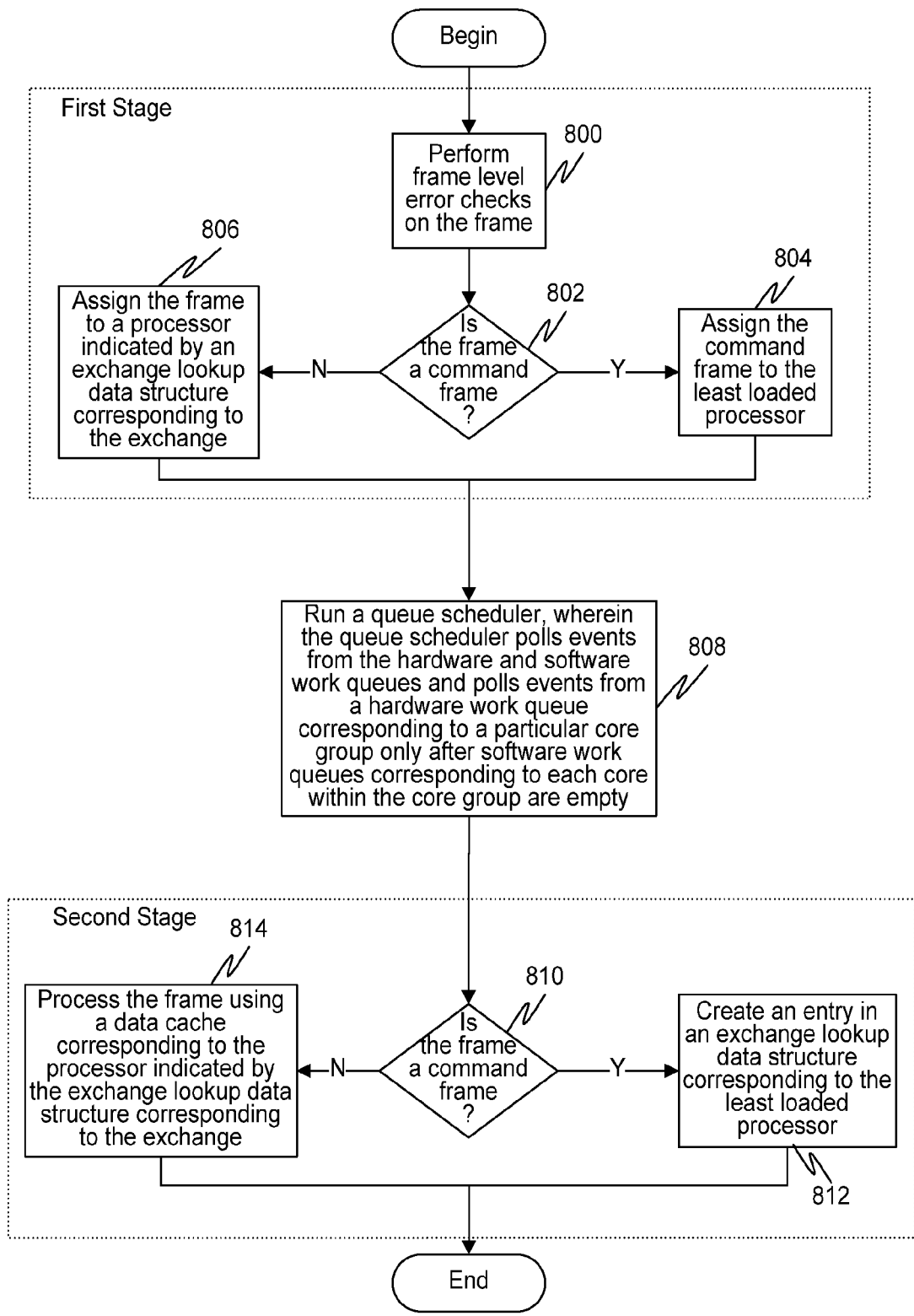
FIG. 8 illustrates another example method for handling a frame at a device having multiple processors or cores in a storage area network.

FIG. 8 illustrates another example method for handling a frame at a device having multiple processors or cores in a storage area network. As with the previous embodiment, the frame may correspond to a particular exchange. In a first stage, at 800, frame level error checks may be performed on the frame. Then at 802, it may be determined if the frame is a command frame. If the frame is a command frame, then at 804, the command frame may be assigned to the least loaded processor. This may be accomplished by placing the frame in a hardware work queue corresponding to a core group. The hardware work queue may utilize an Initiator Target Logic Unit Number (ITL) pointer as a tag to perform tag switching. If the frame is not a command frame, then at 806, the frame may be assigned to a processor indicated by an exchange lookup data structure corresponding to the exchange. This may be accomplished by placing the frame in a software work queue corresponding to the processor or core identified by the core identification. At 808, a queue scheduler may be run, wherein the queue scheduler polls events from a hardware work queue corresponding to a particular core group and software work queues corresponding to each core within the core group, and wherein said queue scheduler polls events from said hardware work queue only after said software work queues are empty.

Figure 9:
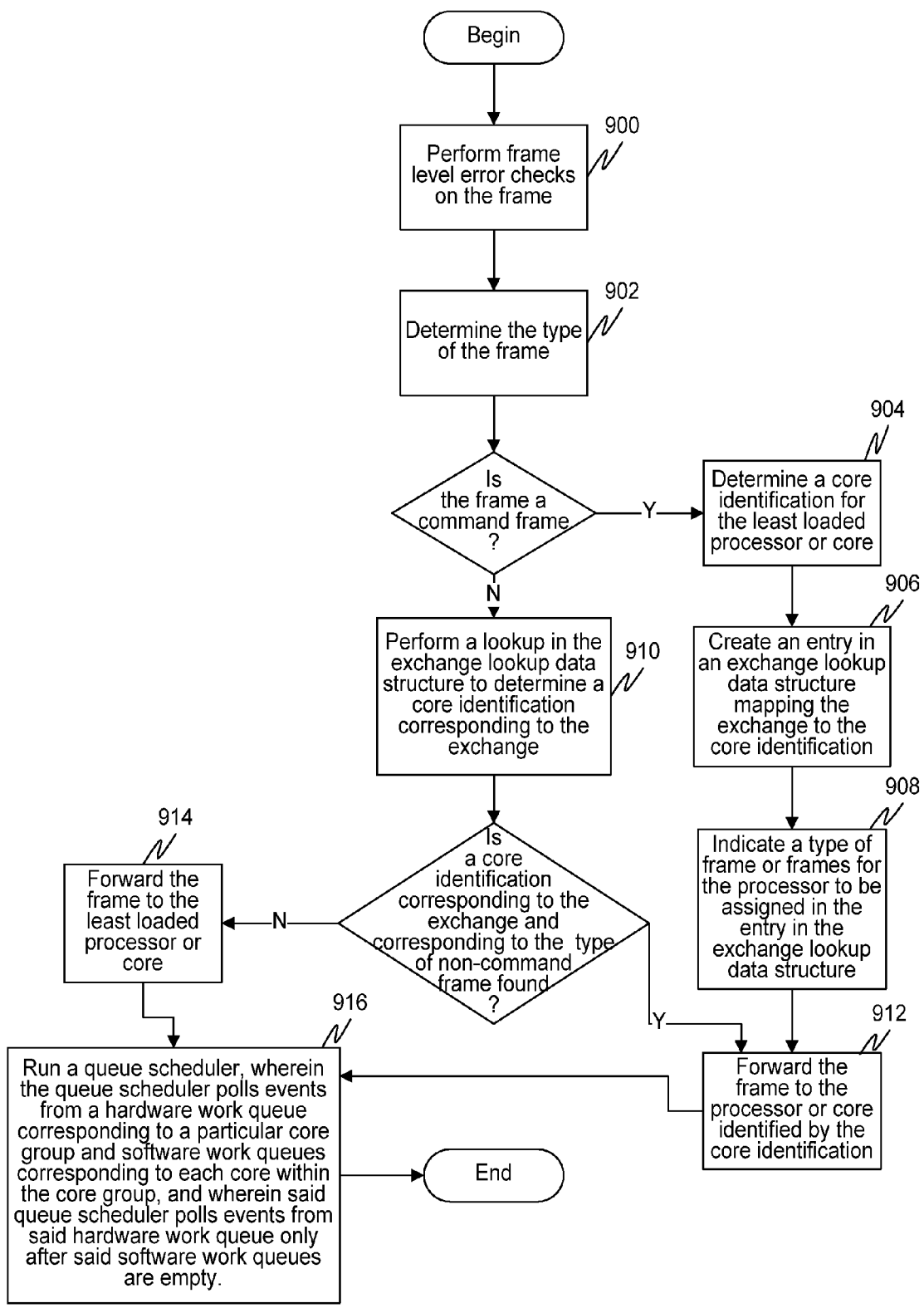
FIG. 9 illustrates another example method for handling a frame at a device having multiple processors or cores in a storage area network.

FIG. 9 illustrates another example method for handling a frame at a device having multiple processors or cores in a storage area network. Once again, the frame may correspond to a particular exchange. At 900, frame level error checks may be performed on the frame. At 902, the type of the frame may be determined. If the frame is a command frame, then at 904, a core identification for the least loaded processor or core may be determined. This may be accomplished by placing the frame in a hardware work queue corresponding to a core group. The hardware work queue may utilize an Initiator Target Logic Unit Number (ITL) pointer as a tag to perform tag switching. Then at 906, an entry may be created in an exchange lookup data structure mapping the exchange to the core identification. Then at 908, a type of frame or frames for the processor to be assigned may be indicated in the entry in the exchange lookup data structure. If the frame is not a command frame, then at 910, a lookup may be performed in the exchange lookup data structure to determine a core identification corresponding to the exchange and corresponding to the type of the non-command frame. Then, at 912, the frame may be forwarded to the processor or core identified by the core identification if the frame is a command frame or if a core identification corresponding to the exchange and corresponding to the type of the non-command frame is found. This may be accomplished by placing the frame in a software work queue corresponding to the processor or core identified by the core identification. At 914, the frame may be forwarded to the least loaded processor or core if the frame is not a command frame and a core identification corresponding to the exchange and corresponding to the type of the non-command frame is not found. As described above, this may be accomplished by placing the frame in a hardware work queue corresponding to a core group. At 916, a queue scheduler may be run, wherein the queue scheduler polls events from the hardware and software work queues. In some implementations, the queue scheduler may poll events from a hardware work queue corresponding to a particular core group only after software work queues corresponding to each core within the core group are empty.

Figure 10:
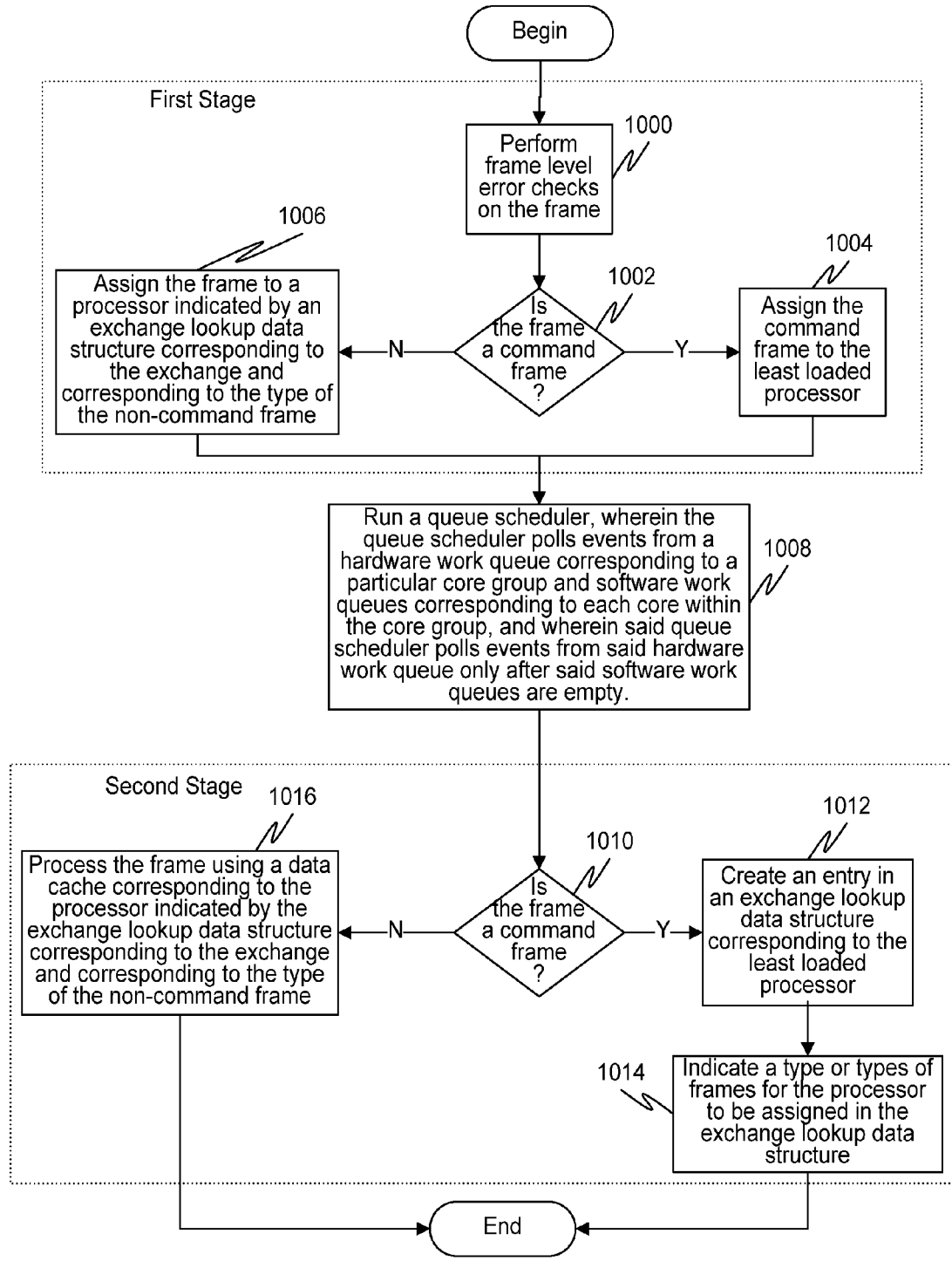
FIG. 10 illustrates another example method for handling a frame at a device having multiple processors or cores in a storage area network.

FIG. 10 illustrates another example method for handling a frame at a device having multiple processors or cores in a storage area network. As with the previous embodiments, the frame may correspond to a particular exchange. In a first stage, at 1000, frame level error checks may be performed on the frame. Then at 1002, the type of the frame may be determined. If the frame is a command frame, then at 1004, the command frame may be assigned to the least loaded processor. This may be accomplished by placing the frame in a hardware work queue corresponding to a core group. The hardware work queue may utilize an Initiator Target Logic Unit Number (ITL) pointer as a tag to perform tag switching. If the frame is not a command frame, then at 1006, the frame may be assigned to a processor indicated by an exchange lookup data structure corresponding to the exchange and corresponding to the type of the non-command frame. This may be accomplished by placing the frame in a software work queue corresponding to the processor or core identified by the core identification. At 1008, a queue scheduler may be run, wherein the queue scheduler polls events from the hardware and software work queues and polls events from a hardware work queue corresponding to a particular core group only after software work queues corresponding to each core within the core group are empty. In a second stage, at 1010, the type of the may be determined. If the frame is a command frame, then at 1012, an entry may be created in an exchange lookup data structure corresponding to the least loaded processor. Then at 1014, a type or types of frames for the processor to be assigned may be indicated in the entry in the exchange lookup data structure. If the frame is not a command frame, then at 1016, the frame may be processed using a data cache corresponding to the processor indicated by the exchange lookup data structure corresponding to the exchange and corresponding to the type of the non-command frame.

Figure 11:
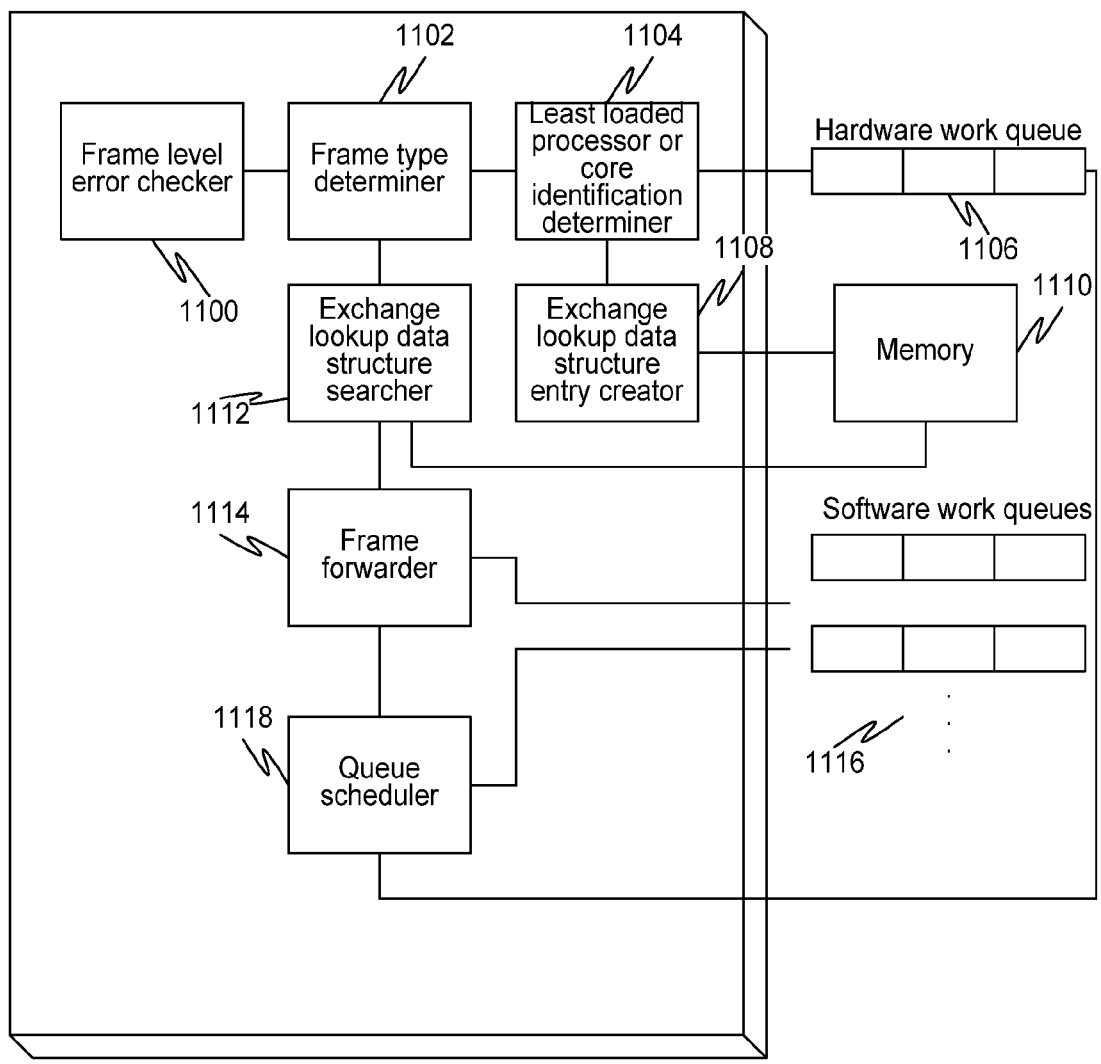
FIG. 11 illustrates an example apparatus for handling a frame at a device having multiple processors or cores in a storage area network.

FIG. 11 illustrates an example apparatus for handling a frame at a device having multiple processors or cores in a storage area network. The frame may correspond to a particular exchange. This may be indicated by, for example, an exchange identification in the frame, although one of ordinary skill in the art will recognize that there may be other ways to track which exchange corresponds to a frame. A frame level error checker 1100 may perform frame level error checks on the frame. A frame type determiner 1102 coupled to the frame level error checker 1100 may determine if the frame is a command frame. If the frame is a command frame, then a least loaded processor core identification determiner 1104 coupled to the frame type determiner 1102 may determine a core identification for the least loaded processor or core. This may be accomplished by placing the frame in a hardware work queue 1106 corresponding to a core group. The hardware work queue 1106 may utilize an Initiator Target Logic Unit Number (ITL) pointer as a tag to perform tag switching. An exchange lookup data structure entry creator 1108 coupled to the least loaded processor core identification determiner 1104 may create an entry in an exchange lookup data structure in memory 1110 mapping the exchange to the core identification. If the frame is not a command frame, then an exchange lookup data structure searcher 1112 coupled to the frame type determiner 1102 may perform a lookup in the exchange lookup data structure in memory 1110 to determine a core identification corresponding to the exchange. Then, a frame forwarder 1114 coupled to the exchange lookup data structure searcher 1112 may forward the frame to the processor or core identified by the core identification. This may be accomplished by placing the frame in a software work queue 1116 corresponding to the processor or core identified by the core identification. The software work queue 1116 may be configured to store frames that are to be performed by the corresponding processor based upon a determination that the corresponding processor is the owner of the exchange of which the frames are a part. A queue scheduler 1118 coupled to the software work queues 1118 and the hardware work queues 1106 may be run, wherein the queue scheduler is configured to polls events from the hardware and software work queues and polls events from a hardware work queue corresponding to a particular core group only after software work queues corresponding to each core within the core group are empty.

Figure 12:
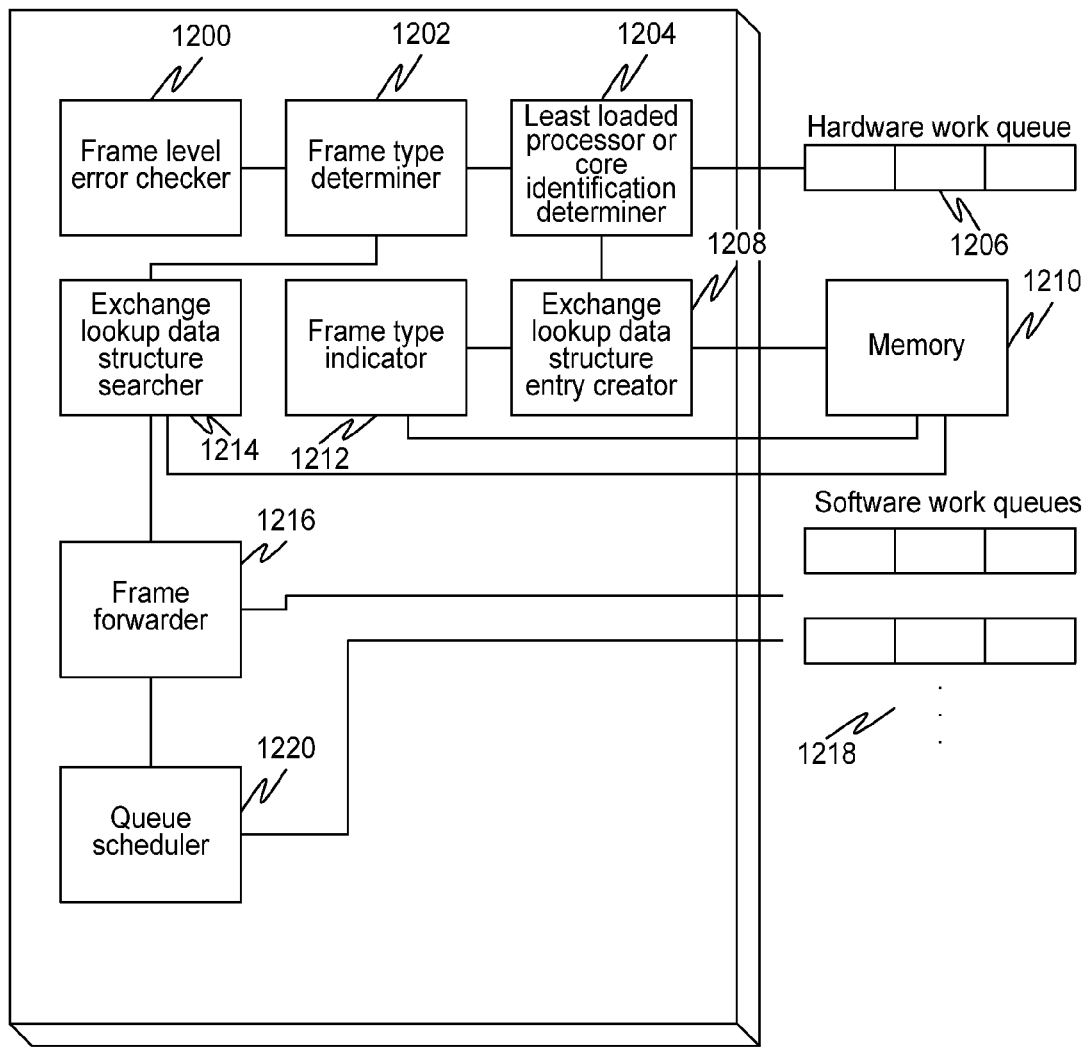
FIG. 12 illustrates another example apparatus for handling a frame at a device having multiple processors or cores in a storage area network.

FIG. 12 illustrates another example apparatus for handling a frame at a device having multiple processors or cores in a storage area network. Once again, the frame may correspond to a particular exchange. A frame level error checker 1200 may perform frame level error checks on the frame. A frame type determiner 1202 coupled to the frame level error checker 1200 may determine the type of the frame. If the frame is a command frame, then a least loaded processor core identification determiner 1204 coupled to the frame type determiner 1202 may determine a core identification for the least loaded processor or core. This may be accomplished by placing the frame in a hardware work queue 1206 corresponding to a core group. The hardware work queue 1206 may utilize an Initiator Target Logic Unit Number (ITL) pointer as a tag to perform tag switching. An exchange lookup data structure entry creator 1208 coupled to the least loaded processor core identification determiner 1204 may create an entry in an exchange lookup data structure in memory 1210 mapping the exchange to the core identification. Then a frame type indicator 1212 coupled to the exchange lookup data structure entry creator 1208 may indicate a type of frame or frames for the processor to be assigned in the entry in the exchange lookup data structure. If the frame is not a command frame, then a frame type exchange lookup data structure searcher 1214 coupled to the frame type determiner 1202 and to the memory 1210 may perform a lookup in the exchange lookup data structure to determine a core identification corresponding to the exchange and corresponding to the type of the non-command frame. Then, a frame forwarder 1216 coupled to the exchange lookup data structure searcher 1214, the frame type determiner 1202 and the least loaded processor core identification determiner 1204 may forward the frame to the processor or core identified by the core identification if the frame is a command frame or if a core identification corresponding to the exchange and corresponding to the type of the non-command frame is found. This may be accomplished by placing the frame in a software work queue 1218 corresponding to the processor or core identified by the core identification. The frame forwarder 1216 may forward the frame to the least loaded processor if the frame is not a command frame and a core identification corresponding to the exchange and corresponding to the type of the non-command frame is not found. As described above, this may be accomplished by placing the frame in a hardware work queue 1206 corresponding to a core group. A queue scheduler 1220 coupled to the software work queues 1218 and the hardware work queues 1206 may poll events from the hardware and software work queues and polls events from a hardware work queue corresponding to a particular core group only after software work queues corresponding to each core within the core group are empty.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method, comprising:
   receiving a lock request at a device having multiple processors or cores, wherein one of the processors or cores has been previously selected to handle lock requests, the device located between a host of a storage area network and a storage volume of the storage area network;
   determining if a predetermined threshold of lock requests for the previously selected processor has been reached; and
   assigning the lock request to one of the multiple processors or cores according to whether the predetermined threshold has been reached.

2. The method of claim 1, wherein said assigning further comprises assigning the lock request to the previously selected processor when it is determined that the predetermined threshold has not been reached.

3. The method of claim 1, wherein said assigning further comprises, when it is determined that the predetermined threshold has been reached:
   reselecting one of the multiple processors or cores to handle lock requests; and
   assigning the lock request to the re-selected processor or core.

4. The method of claim 3, wherein said re-selecting includes selecting a processor or core of the multiple processors or cores, the processor or core having a load level that is less than other processors or cores in the multiple processors or cores.

5. The method of claim 1, further comprising:
   generating a work queue entry (WQE) for the lock request; and
   tagging said WQE to indicate that it represents a lock request.

6. The method of claim 1, further comprising:
   incrementing a counter if the predetermined threshold has not been reached; and
   resetting said counter if the predetermined threshold has been reached.

7. The method of claim 6, wherein said determining includes comparing said counter with said predetermined threshold.

8. The method of claim 1, wherein the lock request relates to a volume of the storage area network, and wherein the lock request is assignable to any of the multiple processors or cores.

9. The method of claim 1, wherein the lock request relates to a volume of the storage area network, and wherein a single one of the multiple processors or cores is not dedicated to handling lock requests for the volume.

10. A method, comprising:
    receiving a lock request at a device having multiple processors or cores, wherein one of the processors or cores has been previously selected to handle lock requests, the device being located between a host of a storage area network and a storage volume of the storage area network;
    determining if a timer for the previously selected processor has reached a predetermined time; and
    assigning the lock request to one of the multiple processors or cores according to whether the predetermined time has been reached.

11. The method of claim 10, wherein said assigning further comprises:
    assigning the lock request to the previously selected processor when it is determined that the timer has not reached the predetermined time.

12. The method of claim 10, wherein said assigning further comprises, when it is determined that the timer has not reached the predetermined time:
    re-selecting one of the multiple processors or cores to handle lock requests; and
    assigning the lock request to the re-selected processor or core.

13. The method of claim 12, wherein said re-selecting includes selecting a processor or core of the multiple processors or cores, the processor or core having a load level that is less than other processors or cores in the multiple processors or cores.

14. The method of claim 10, further comprising:
    generating a work queue entry (WQE) for the lock request; and
    tagging said WQE to indicate that it represents a lock request.

15. The method of claim 10, further comprising:
    incrementing a counter if the timer has not reached the predetermined time; and
    resetting said counter if the timer has reached the predetermined time.

16. An apparatus, comprising:
    means for receiving a lock request at a device having multiple processors or cores, wherein one of the processors or cores has been previously selected to handle lock requests, the device located between a host of a storage area network and a storage volume of the storage area network;
    means for determining if a predetermined threshold of lock requests for the previously selected processor has been reached; and
    means for assigning the lock request to one of the multiple processors or cores according to whether the predetermined threshold has been reached.

17. An apparatus, comprising:
    a plurality of processors or cores;
    a memory, the apparatus being adapted for:
      receiving a lock request, wherein one of the plurality of processors or cores has been previously selected to handle lock requests, the apparatus being located between a host of a storage area network and a storage volume of the storage area network;
      determining if a predetermined threshold of lock requests for the previously selected processor has been reached; and
      assigning the lock request to one of the plurality of processors or cores according to whether the predetermined threshold has been reached.

18. The apparatus of claim 17 wherein the apparatus is contained in a storage services module that plugs into a network switch of the storage area network.

19. The apparatus of claim 17 wherein the apparatus communicates with the host and the storage volume according to the Small Computing System Interface (SCSI) protocol.

20. The apparatus of claim 19 wherein the host communicates with the apparatus at high speed via the SCSI protocol by utilizing Fibre Channel (FC) switching technology.

21. The apparatus of claim 17, wherein said assigning further comprises assigning the lock request to the previously selected processor when it is determined that the predetermined threshold has not been reached.

22. The apparatus of claim 17, wherein said assigning further comprises, when it is determined that the predetermined threshold has been reached:
   reselecting one of the plurality of processors or cores to handle lock requests; and
   assigning the lock request to the re-selected processor or core.

23. The apparatus of claim 22, wherein said re-selecting includes selecting a processor or core of the multiple processors or cores, the processor or core having a load level that is less than other processors or cores in the multiple processors or cores.

24. The apparatus of claim 17, the apparatus being further adapted for:
   generating a work queue entry (WQE) for the lock request; and
   tagging said WQE to indicate that it represents a lock request.

25. The apparatus of claim 17, the apparatus being further adapted for:
   incrementing a counter if the predetermined threshold has not been reached; and
   resetting said counter if the predetermined threshold has been reached.

26. The apparatus of claim 25, wherein said determining includes comparing said counter with said predetermined threshold.

27. An apparatus, comprising:
   means for receiving a lock request at a device having multiple processors or cores, wherein one of the processors or cores has been previously selected to handle lock requests, the device being located between a host of a storage area network and a storage volume of the storage area network;
   means for determining if a timer for the previously selected processor has reached a predetermined time; and
   means for assigning the lock request to one of the multiple processors or cores according to whether the predetermined time has been reached.

28. The apparatus of claim 27, wherein said means for assigning further comprises:
   means for assigning the lock request to the previously selected processor when it is determined that the timer has not reached the predetermined time.

29. The apparatus of claim 27, wherein assigning further comprises, when it is determined that the timer has not reached the predetermined time:
   re-selecting a processor to handle lock requests; and
   assigning the lock request to the re-selected processor.

30. The apparatus of claim 29, wherein said re-selecting includes selecting a processor or core of the multiple processors or cores, the processor or core having a load level that is less than other processors or cores in the multiple processors or cores.

31. The apparatus of claim 27, further comprising:
   means for generating a work queue entry (WQE) for the lock request; and
   means for tagging said WQE to indicate that it represents a lock request.

32. The apparatus of claim 27, further comprising:
   means for incrementing a counter if the timer has not reached the predetermined time; and
   means for resetting said counter if the timer has reached the predetermined time.

* * * * *